United States Patent
Giust et al.

(10) Patent No.: US 11,070,442 B2
(45) Date of Patent: Jul. 20, 2021

(54) METHOD AND NETWORK FOR MANAGING AND ORCHESTRATING VIRTUAL NETWORK FUNCTIONS AND NETWORK APPLICATIONS

(71) Applicant: NEC Laboratories Europe GmbH, Heidelberg (DE)

(72) Inventors: Fabio Giust, Heidelberg (DE); Konstantinos Samdanis, Munich (DE); Faqir Zarrar Yousaf, Leimen (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 225 days.

(21) Appl. No.: 15/777,954

(22) PCT Filed: Nov. 24, 2015

(86) PCT No.: PCT/EP2015/077437
§ 371 (c)(1),
(2) Date: May 22, 2018

(87) PCT Pub. No.: WO2017/088905
PCT Pub. Date: Jun. 1, 2017

(65) Prior Publication Data
US 2018/0351824 A1 Dec. 6, 2018

(51) Int. Cl.
*H04L 12/24* (2006.01)
*G06F 9/54* (2006.01)
(Continued)

(52) U.S. Cl.
CPC .......... *H04L 41/20* (2013.01); *G06F 9/45558* (2013.01); *G06F 9/542* (2013.01);
(Continued)

(58) Field of Classification Search
CPC ..... H04L 41/20; H04L 67/10; G06F 9/45558; G06F 9/543; G06F 2009/45595; H04W 36/0022; H04W 88/085; H04W 4/60
See application file for complete search history.

(56) References Cited

U.S. PATENT DOCUMENTS 10,111,163 B2 * 10/2018 Vrzic ................ H04W 28/0247
10,116,571 B1 * 10/2018 Bertz ....................... H04L 67/38
(Continued)

FOREIGN PATENT DOCUMENTS

KR 20150058050 A 5/2015

OTHER PUBLICATIONS

"ETSI GS NFV 002" v1.1.1, Group Specification, Oct. 2013.
(Continued)

*Primary Examiner* — Patrice L Winder
*Assistant Examiner* — Angela M Widhalm De Rodrig
(74) *Attorney, Agent, or Firm* — Leydig, Voit & Mayer, Ltd.

(57) ABSTRACT

A method for managing and orchestrating virtual application functions jointly with virtual network functions is done through a single management and orchestration (MANO) framework within a network. The method includes creating, by a system for (virtual) application function and virtual network function management and orchestration, at least one service or service chain that considers or comprises at least one (virtual) network application and/or at least one virtual network function. A virtual application function (VAF) entity is provided as a container for network applications together with a VAF manager (VAFM) for the VAF.

18 Claims, 9 Drawing Sheets

(51) Int. Cl.
*G06F 9/455* (2018.01)
*H04L 29/08* (2006.01)
*H04W 36/00* (2009.01)
*H04W 88/08* (2009.01)
*H04W 4/60* (2018.01)

(52) U.S. Cl.
CPC ......... *H04L 67/10* (2013.01); *H04W 36/0022* (2013.01); *H04W 88/085* (2013.01); *G06F 2009/45595* (2013.01); *H04W 4/60* (2018.02)

(56) References Cited

U.S. PATENT DOCUMENTS

| | | | |
|---|---|---|---|
| 2005/0240558 A1* | 10/2005 | Gil | G06F 16/972 |
| 2014/0317261 A1 | 10/2014 | Shatzkamer et al. | |
| 2015/0063166 A1* | 3/2015 | Sif | G06F 9/45558 370/254 |
| 2015/0180730 A1* | 6/2015 | Felstaine | G06F 11/0709 709/225 |
| 2016/0112261 A1* | 4/2016 | Amato | H04L 67/10 709/220 |
| 2016/0205004 A1* | 7/2016 | Chou | H04L 41/142 709/224 |
| 2016/0337206 A1* | 11/2016 | Bugenhagen | H04L 12/28 |
| 2016/0373474 A1* | 12/2016 | Sood | H04L 63/18 |
| 2016/0381150 A1* | 12/2016 | Rajagopal | H04L 41/28 709/223 |
| 2017/0048008 A1* | 2/2017 | Yi | H04B 17/382 |
| 2017/0063628 A1* | 3/2017 | Rasanen | H04L 41/0803 |
| 2017/0078216 A1* | 3/2017 | Adolph | G06F 9/45558 |
| 2017/0104609 A1* | 4/2017 | Mcnamee | H04L 63/06 |
| 2017/0126792 A1* | 5/2017 | Halpern | G06F 9/5061 |
| 2017/0329639 A1* | 11/2017 | Morper | G06F 9/5005 |
| 2018/0062945 A1* | 3/2018 | Ni | H04L 41/5054 |
| 2018/0248867 A1* | 8/2018 | Liu | H04L 29/06 |
| 2018/0262410 A1* | 9/2018 | Chou | G06F 9/45558 |

OTHER PUBLICATIONS

"Liaison to 3GPP on TTC's white paper on future mobile networking", TTC ad-hoc Group on Future Mobile Networking, 3GPP SA, SA1, Apr. 9, 2015, pp. 1-7.

Yun Chao Hu, et al., "Mobile Edge Computing A key technology towards 5G", ETSI White Paper No. 11, Sep. 2015, pp. 1-17.

Milan Patel, et al., "Mobile-Edge Computing", Introductory Technical White Paper, issue 1, Sep. 2014, pages.

* cited by examiner

METHOD AND NETWORK FOR MANAGING AND ORCHESTRATING VIRTUAL NETWORK FUNCTIONS AND NETWORK APPLICATIONS

CROSS-REFERENCE TO PRIOR APPLICATIONS

This application is a U.S. National Stage Application under 35 U.S.C. § 371 of International Application No. PCT/EP2015/077437 filed on Nov. 24, 2015. The International Application was published in English on Jun. 1, 2017 as WO 2017/088905 A1 under PCT Article 21(2).

The project leading to this application has received funding from the European Union's Horizon 2020 research and innovation programme under grant agreement No 671584.

FIELD

The present invention relates to a method for managing and orchestrating virtual network functions and network applications within a network. Further, the present invention relates to a corresponding network and to an orchestrator entity of a system for virtual network function and network application management and orchestration.

BACKGROUND

There are methods of managing and orchestrating of virtual network functions and management of network applications within a network that are known from prior art.

Regarding Mobile Edge Computing, MEC, for example, the ETSI MEC ISG focuses on evolving the edge part of the mobile network in order to accommodate enhanced services provided by the mobile operator or a third party entity. Such services span across caching techniques for Content Delivery Network, CDN, located at the edge, Radio Access Network, RAN, analytics, vehicular communications, and, in general, all those applications that can benefit from a closer deployment to the User Equipment, UE, see ETSI MEC ISG Introductory Technical White Paper. Such applications are accommodated in a generic cloud platform referred to as MEC server that can be located at the base station, referred to as evolved Node B, eNodeB, in 3GPP terminology, RAN aggregation points, e.g. small cell gateways, or Radio Network Controllers, RNCs.

Since the MEC server is devised as a platform where multiple MEC applications, that may also be virtualized application instances, from different vendors are hosted, and, in general, different instances of a MEC application might run on different platforms, there is a need for a management system necessary to coordinate the operations carried out by distributed instances of MEC applications, as well as control and manage such instances. For accommodating these requirements, there is a need for a MEC management and orchestration system with operating characteristics similar to the MANO entity designed within the ETSI NFV ISG.

Further, U.S. Patent Application Publication No. 2014/0317261 discloses a service chain optimization considering network functions considering the interdependency among the Virtual Network Functions, VNFs, for a particular service or achieving a Quality of Service, QoS, target.

SUMMARY

In an embodiment, the present invention provides a method for managing and orchestrating virtual application functions jointly with virtual network functions through a single management and orchestration (MANO) framework within a network. The method includes creating, by a system for (virtual) application function and virtual network function management and orchestration, at least one service or service chain that considers or comprises at least one (virtual) network application and/or at least one virtual network function. A virtual application function (VAF) entity is provided as a container for network applications together with a VAF manager (VAFM) for the VAF.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention improve and further develop a method and network for managing and orchestrating virtual network functions and network applications for allowing an effective support of both virtual network functions and network applications in the creation of service chains.

In accordance with embodiments of the invention, the improvements are provided by a method for managing and orchestrating virtual network functions and network applications within a network, wherein a system for virtual network function and network application management and orchestration creates at least one service or service chain that considers or comprises at least one virtual network function and/or at least one network application.

Further, according to another embodiment of the invention, the improvements are provided by a network for managing and orchestrating virtual network functions and network applications, wherein a system for virtual network function and network application management and orchestration is provided for creating at least one service or service chain that considers or comprises at least one virtual network function and/or at least one network application.

Further, an orchestrator entity of a system for virtual network function and network application management and orchestration is claimed.

According to an embodiment of the invention it has been recognized that a very effective support of both virtual network functions and network applications in the creation of service chains is possible by providing a system for virtual network function and network application management and orchestration which is able to create at least one service or service chain that considers or comprises at least one virtual network function and/or at least one network application. This means that such a system is provided for the support of virtual network functions and network applications. During creation of a service chain the system can consider both virtual network functions and network applications. As a result a service chain created by the system can comprise both at least one virtual network function and at least one network application. The method and network are able to address both virtual network functions and network applications together.

According to an embodiment of the invention the system for virtual network function and network application management and orchestration can be provided by a combination or joint of a management system architecture for network applications with a Network Function Virtualization, NFV, Management and Orchestration, MANO, architecture. By such a combination or joint of said known components a management system architecture for network applications and a NFV MANO architecture an effective support of virtualized or virtual network functions and network applications in the creation of service chains is possible.

According to a further embodiment an orchestrator system of the management system architecture for network applications can be introduced which interacts with the NFV MANO architecture. In this case a known management system architecture for network applications can be enhanced by a separate orchestrator system for this management system architecture for cooperating or interacting with the NFV MANO architecture.

According to a further embodiment the management system architecture for network applications can be combined or joint with the NFV MANO architecture under a single platform. In this case computing, storage and/or network hardware, for example, can be shared by components of the management system architecture for network applications and the NFV MANO architecture under this single platform. This will provide a simplification of the whole network architecture by avoiding deployment of unnecessary additional hardware components. Further, on the basis of such a combination under a single platform communication between components of the architecture can be simplified.

According to a further embodiment a service platform of the management system architecture for network applications can be realized by a virtual function within the NFV MANO architecture. This provides a smart integration of a management system architecture for network applications within a NFV MANO architecture. A corresponding management of the integrated service platform can be provided by a VNF Manager of the NFV MANO architecture in a simple way.

According to a further embodiment the service platform can be handled as a single VNF. This is a very simple realization of an integration of the service platform into the NFV MANO architecture. According to a further embodiment a VNF can be provided for each service instance of the service platform. This provides a very sophisticated integration of the service platform. According to a further embodiment a VNF can be provided for a selected set of service instances of the service platform. Depending on individual situations the selection of the set of service instances of the service platform can be changed.

According to a further embodiment a platform management system can be mapped to or combined with a manager entity of the NFV MANO architecture. This provides a suitable combination of the management functionalities or entities of the management system architecture for network applications and the NFV MANO architecture.

According to a further embodiment a Virtual Application Function, VAF, entity as a container for network applications can be provided together with a VAF Manager, VAFM, for VAFs. On the basis of such a VAF entity and VAF Manager it is possible to take care of the lifecycle management of a VAF in a simple way.

According to a further embodiment at least one interface or reference point between the VAFM and an orchestrator entity and/or between the VAF and its VAFM and/or between the VAFM and a Virtualized Infrastructure Manager, VIM, can be provided. Such a new reference point can be for example an Orchestrator-VAFM carrying the interfaces between the Orchestrator and the VAFM, which enable the MANO Orchestrator to provide information to the VAFM regarding service chains composed by virtual functions and network applications. Another reference point can be a Virtual Application-VAFM carrying the interfaces between a VAF and its VAFM that enable the management of network applications. Another reference point can be a Virtual Infrastructure-VAFM carrying the interfaces between a VAFM and the VIM to enable the initiation of virtual machines with specific hardware requirements including but not limited to computing power, storage, etc.

Within a further embodiment the VAF and the VAFM can be provided as internal modules of a VNF and a VNF Manager, VNFM, respectively. This will provide a very smart construction of a network architecture.

According to a further embodiment a virtual network function or network application or MEC function can trigger the system for virtual network function and network application management and orchestration to improve or optimize a performance of an attached user or to provide changes or rearrangements in virtualized or virtual functions of a core network. By such a trigger mechanism a continuous improvement or optimization of a performance of an attached user is possible.

According to a further embodiment the system for virtual network function and network application management and orchestration can be provided with an orchestrator entity for virtual network functions and network applications. Such an orchestrator entity can be realized as a common entity for the support of virtual network functions and network applications in the creation of service chains.

According to a further embodiment the network applications or application can comprise at least one MEC application. However, other network applications and future applications can be supported by the claimed method and network and orchestrator entity. There is no limitation to MEC applications.

Embodiments of the present invention can provide the following enhancements and constructive features:

Embodiments of this invention can introduce a joint orchestration mechanism that considers both virtual network functions and MEC applications or other applications, for example. Embodiments define a converged architecture aligning and integrating MEC application management with the NFV MANO, extending the NFV MANO system by introducing (i) a new element called Virtual Application Function Manager, dedicated to manage Virtual Application Functions that leverage or concur to form network services, (ii) a set of interfaces towards the Virtual Application Function Manager, and (iii) a set of interface and function enhancements related to the common orchestration system. The resulting system enables MANO operations triggered by virtual applications' runtime processes, or MEC services that aim to accommodate applications management together with virtual network functions management.

Orchestrating VNFs and MEC applications jointly can provide several benefits from both the infrastructure cost and operation perspective, i.e. CAPEX and OPEX. The reasons are twofold; one is related with the ability of using edge cloud platforms commonly to support both applications and virtualized functions. The second comes from using a common management and orchestration system, i.e. an enhanced version of NFV MANO, referred to as MANO+ in this invention. Such a MANO+ entity can then achieve a joint application and VNF management avoiding in this way a separate management entity dedicated for MEC applications or other applications, an option that require additional hardware and coordination with the traditional NFV MANO. Combining application and VNFs management and orchestration under a single platform can also enable a coordinated, aligned operation that can efficiently create service chains composed by a mix of VNFs and MEC applications or other applications.

The aforementioned benefits will allow mobile operators to have a better return on investment being able to support both NFV and MEC on deployed edge-cloud and management infrastructures, while at the same time providing a richer set of service options combining applications and virtualized or virtual functions.

Embodiments of the invention can provide the following further features and advantages:

1. Introduces an orchestration entity for the MEC or network application management system, namely the MEC Orchestrator, able to jointly manage virtualized network functions and MEC applications or other applications.
2. Introduces MANO architecture enhancements for achieving a joint virtual network function and application orchestration creating service chains that consider both virtual functions and MEC applications or applications.
3. Provides a combination of the MEC or network application management system with the NFV MANO in both the scenarios where the two systems are separated or merged together. In the latter case the steps below are introduced.
   a. Introduces two NFV architecture elements referred to as Virtual Application Function, VAF, as the container of the MEC applications, and the VAF Manager, VAFM, to take care of the lifecycle management of a VAF.
   b. Introduces a new reference point named the Orchestrator-VAFM, Or-Vafm, carrying the interfaces between the Orchestrator and the VAFM, which enable the MANO orchestrator to provide information to the VAFM regarding service chains composed by virtual functions and MEC applications or other applications.
   c. Introduces a new reference point named Virtual Application-VAFM, Va-Vafm, carrying the interfaces between a VAF and its VAFM that enable the management of MEC applications or other applications.
   d. Introduces a new reference point named Virtual Infrastructure-VAFM, Vi-Vafm, carrying the interfaces between a VAFM and the VIM to enable the initiation of virtual machines with specific hardware requirements including but not limited to computing power, storage, etc.

An embodiment of the invention can provide a method for providing joint virtual network function and MEC application support in 3GPP networks providing flexible service chains on-demand, comprises the minimal steps of:

1) A service request enters the network and reaches the MANO orchestrator.
2) MANO orchestrator creates the flexible service chain and provides information to the VNF Manager and VAF Manager initiating the required NFVI resources.
3) The VNF Manager and VAF Manager take care of the lifecycle management of their respective components that compose the service chain. In addition, the VAFM is in charge of application specific runtime management.

According to embodiments of the invention the network can extend its set of networks services from a collection of network functions to a collection of network functions and network applications, let these be MEC-based, or any other future application.

An embodiment of the invention enables network optimization driven by runtime processes of applications that represent the main logic for enhanced end-to-end services to users.

For example, the extended set of network services might include video and selected traffic optimization, machine-type-communication, vehicular communications, etc.

Figure 1:
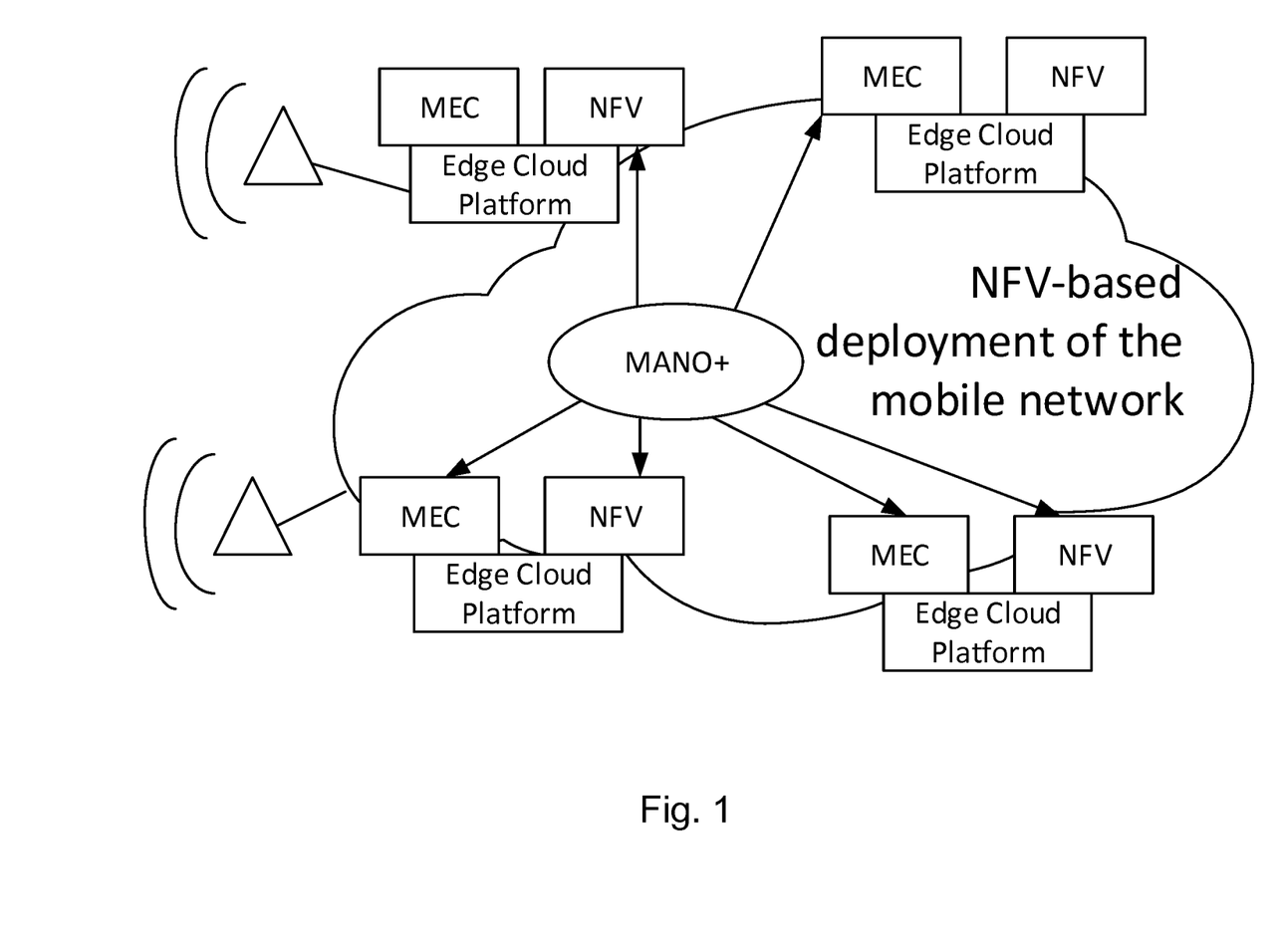
FIG. 1 is showing within a diagram an embodiment of a network structure according to the invention wherein a MEC orchestrator is integrated within a NFV MANO for extending the NFV MANO into MANO+ as to include the management of the MEC system.

An overview of a common system according to an embodiment of the invention that enables MEC applications and VNFs to be offered at edge cloud platforms, which are managed by a common orchestration system, i.e. MANO+, is illustrated in FIG. 1.

This invention introduces an orchestrator for the MEC system and specifies a mapping of MEC's architecture to the NFV MANO. Additionally, a new element is introduced in the NFV MANO system called Virtual Application Function Manager, VAFM. The VAFM fills the gap between application specific management requirements, e.g., transfer of application related content to another application like contextual information, with respect to the NFV management system, i.e., the MANO. In order to fill such a gap, this invention introduces a set of interfaces that provide interaction between the VAFM and the existing NFV MANO architecture, as well as a set of enhancements related to the common orchestration system that aim to accommodate application management requirements together with virtual network functions.

An embodiment of this invention contains an architecture and method to combine into a single enhanced MANO platform, MANO+, the support of both virtualized/virtual network functions and MEC applications enabling the means of providing a joint optimization in the creation of service chains.

Figure 2:
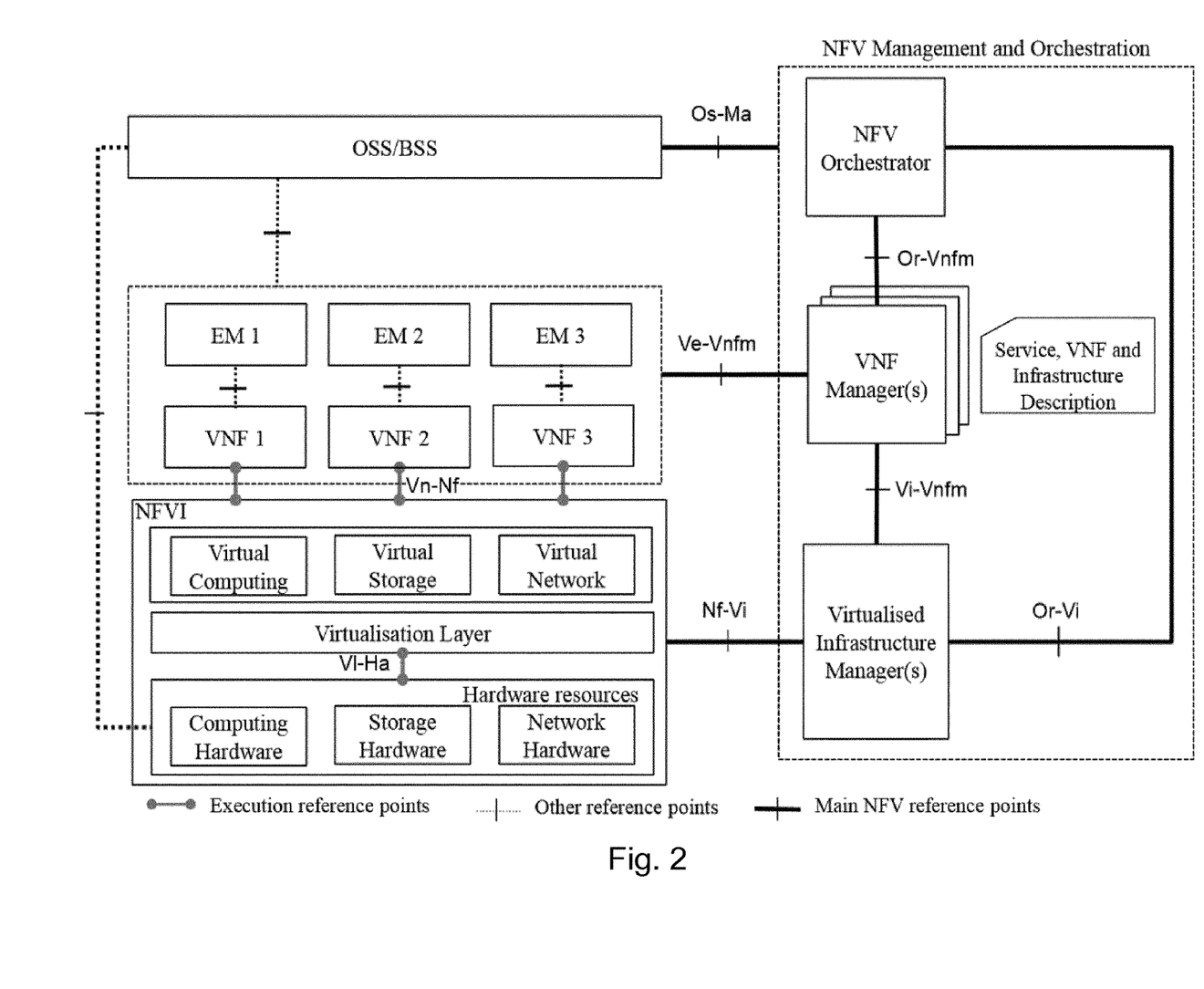
FIG. 2 is showing within a diagram a conventional NFV architectural framework.

The basic NFV architecture, see ETSI GS NFV-002 Architectural Framework, v1.2.1, consists of three major blocks grouping together similar functions as it is depicted in FIG. 2. The Network Function Virtualization Infrastructure, NFVI, consists of the physical resources, such as the computing, storage and network resources that enable the installation and running of Virtual Network Functions, VNFs, and including the corresponding Element Manager, EM. The lifecycle management of physical and virtual resources is performed by the NFV Management and Orchestration, MANO, block, which is comprised by the Virtual Infrastructure Manager, VIM, the Virtual Network Function Manager, VNFM, and the Network Function Virtualization service Orchestrator, NFVO. The NFV MANO also interacts with the NFV external Operational Support System/Business Support System, OS S/BSS, landscape, which allows NFV to be integrated into an existing network-wide management landscape. The entire NFV system is driven by a set of metadata describing the Service, VNFs and Infrastructure requirements, which are feed to the NFV Management and Orchestration system, in order to act accordingly.

Figure 3:
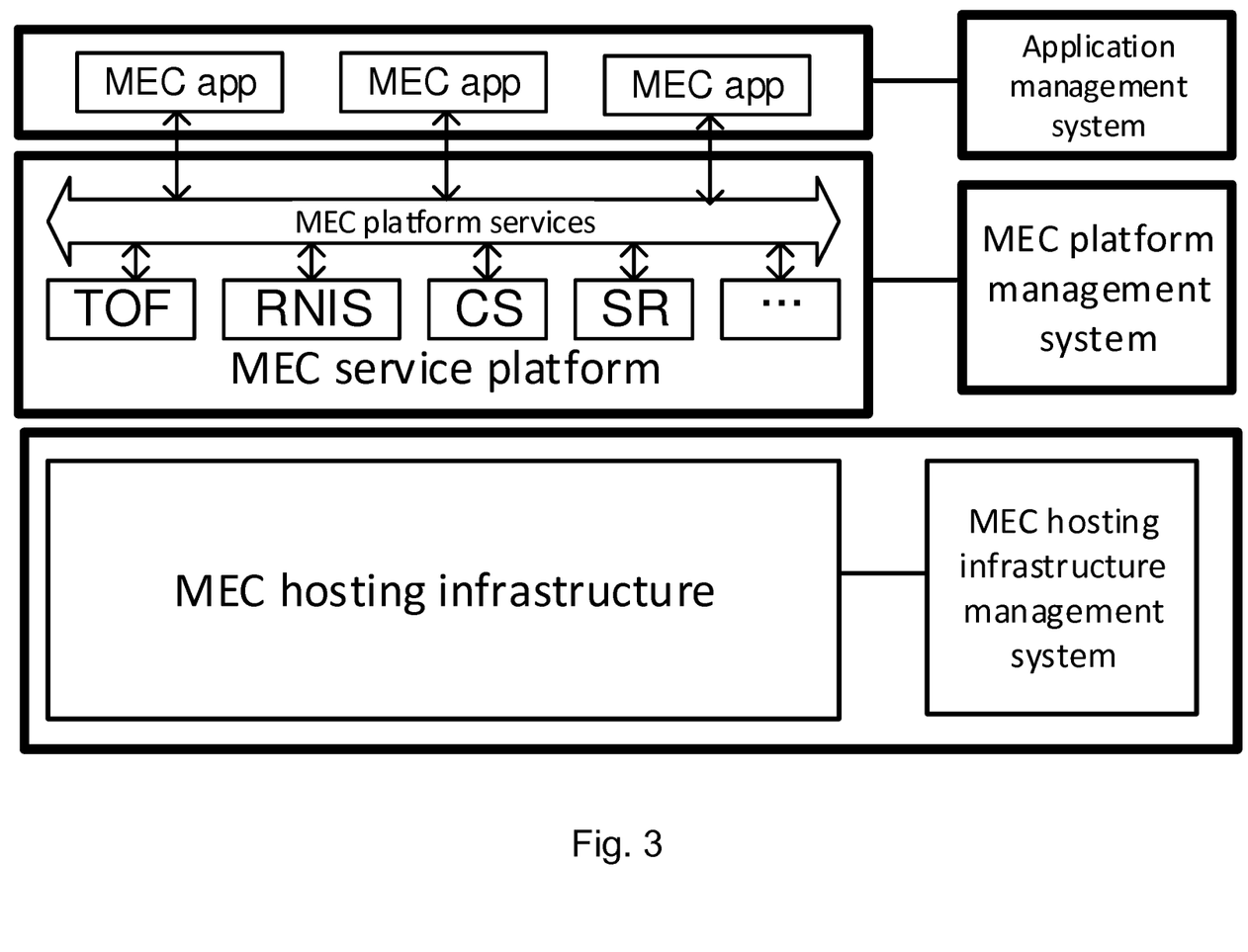
FIG. 3 is showing within a diagram a conventional MEC server architecture.

The central entity of a MEC system is the MEC server, see ETSI MEC ISG Introductory Technical White Paper, employing the architecture depicted in FIG. 3. Such MEC server architecture consists of a hardware infrastructure and a virtualization layer, that together compose the hosting infrastructure, while on the top, a service platform layer enables the support of different MEC applications, hosted on virtual machines. A corresponding management system is associated with the MEC hosting infrastructure, MEC service platform and the application management. In the MEC Technical Requirement documents, see ETSI GS MEC-002 Technical Requirements, v0.4.2, these three entities are generally referred to as the "MEC management system", and, according to the same document, the tasks carried out by the MEC management system are diverse in nature, as they span from lifecycle management of MEC applications, to mobility support.

In order to integrate the MEC management system with the NFV MANO, according to an embodiment of this invention we propose to map the MEC architecture functional elements to the NFV architectural blocks.

The MEC hosting infrastructure and the corresponding MEC hosting infrastructure management system can be mapped directly to the NFVI and VIM of the ETSI NFV MANO architecture, since both layers provide infrastructure resources, including but not limited to compute, network, storage, etc., and the corresponding management mechanism for the hosted VNFs.

Furthermore, the MEC server provides a number of services to hosted applications through the platform layer including but not limited to: Traffic Offload Function, TOF, Radio Network Information Services, RNIS, Communication Services, CS, Service Registry, SR, etc.

In this context, the MEC ISG defines how MEC services are initiated and consumed. According to ETSI GS MEC-002 Technical Requirements, v0.4.2, "A service is provided and consumed. Both the platform itself and authorized applications can provide services. Similarly, both the platform itself and authorized applications can consume services. In some cases, and especially in a multi-vendor environment, the service can be provided concurrently by multiple sources. This allows the platform or the applications consuming the service to receive all information required for executing their task."

Figure 4:
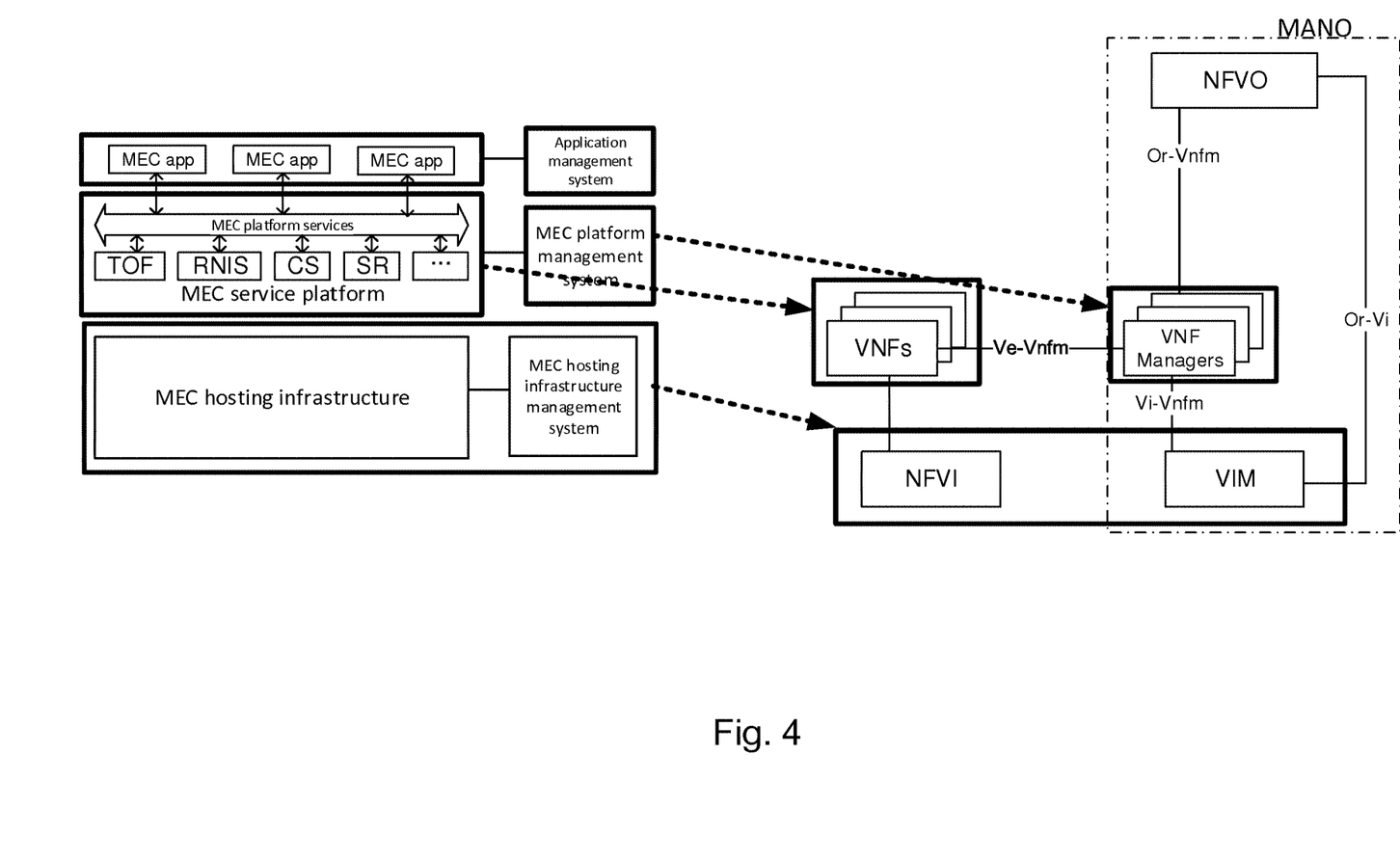
FIG. 4 is showing within a diagram a mapping of a MEC platform into NFV framework architecture according to an embodiment of the invention.

Therefore, the MEC service platform can be realized by a virtual function, and hence it is a common understanding that it should map to the VNFs as per the NFV architecture. This mapping can be performed either by (i) considering the entire MEC service platform as a single VNF or (ii) a separate and independent VNF for each service instance of the MEC service platform, e.g. the Traffic Offload Function, TOF, or Radio Network Information Services, RNIS, or Communication Services, CS, or Service Registry, SR, etc., or (iii) selecting a set of the aforementioned services according to the expected supporting MEC applications. The corresponding MEC Platform Management system should then be mapped to the NFV's VNF Manager entity, as per the diagram in FIG. 4.

Alternatively, in another embodiment the MEC system can introduce a separate orchestrator system, which interacts with the NFV framework architecture. In that case the MEC orchestrator would re-assemble the operations and hence functions of the combined orchestrator described a priori. Therefore this invention also holds for the MEC orchestrator entity that interacts with the MEC management functions.

Since MEC applications exhibit peculiar characteristics that make them intrinsically different to VNFs—lightweight in nature, more frequent update cycles, need to pass integrity and authenticity checks, exacerbated multivendor ecosystem, etc.—, this invention introduces a Virtual Application Function, VAF, with an extended and dedicated application oriented purpose, and its related management system, referred to as the VAF Manager. The reason for introducing VAF is to tailor the management functions unique to the application requirements, and at the same time, exposing a common set of interfaces to the management and orchestration system. This allows more flexibility and a higher degree of application performance management including resiliency, e.g., by enabling the application layer to trigger the need of introducing or withdrawing MEC services and NFV functions based on performance experience. By introducing this separation, this invention enables application-driven or even Quality of Experience, QoE, based MEC service initiation, which can also be combined with instantiation/scaling/migration/cloning or other lifecycle management related operations of a VNF.

To support such a new umbrella of network applications, the following additions to the NFV framework architecture are proposed:

Virtual Application Function, VAF, entity, as the container of the MEC applications, which can also support other applications too not related to MEC.

VAF Manager, VAFM, as the entity in charge for the application functionality management and lifecycle management of a VAF. The functional scope of VAFM is quite similar to the NFV's MANO VNFM, see ETSI GS NFV-MAN001 Management and Orchestration, v1.1.1. As the VNFM, it renders lifecycle management, LCM, of the VAF entities such as VAF instance(s) instantiation/configuration, VAF software upgrade/update/modification, scaling in/out/up/down, healing, instance termination, feasibility/integrity checking etc. In addition, it manages runtime operations of VAFs, especially when such an application is distributed among several platforms and they need coordination, contextual information transfer, etc. It shall also manage performance measurement results and faults/events information between the VAF(s) and the VNFs in the underlying MEC service platform.

The aforementioned functional blocks introduce the following reference points:

Orchestrator-VAFM, Or-Vafm, reference point, as the collection of interfaces between the Orchestrator and the VAFM Virtual Application-VAFM, Va-Vafm, reference point, as the collection of interfaces between a VAF and its VAFM Virtual Infrastructure VAFM, Vi-Vafm, reference point, as the collection of interfaces between a VAFM and the VIM Multiple interfaces can be defined over the above reference points that can support relevant operations between the functional blocks. As an example, the Performance Management interface can prescribe all operations relevant to performance management. Similarly other interfaces can be defined, such as Resource Management, Fault Management, Policy Management to name a few, over these reference points depending on the scope of operation.

The support of the new functional blocks would require enhancements in the repositories, which can be used by both VAFM and MANO and are connected to the orchestrator:

VAF Catalogue representing the repository of all the on-boarded VAF Packages and includes the VAF Descriptor, VAFD, see below. It supports the creation and management of the VAF Package—as per VAFD, application software images, etc. Both Orchestrator and VAFM can query the VAF Catalogue for finding and retrieving a VAFD, to support different operations, e.g. validation, checking instantiation feasibility. Its role is quite similar to the VNF Catalogue, see ETSI GS NFV-MAN001 Management and Orchestration, v1.1.1, but in the context of application functions.

VAF Descriptor, VAFD, which is included in the VAF Catalogue, is a template describing a VAF in terms of deployment and operational behavior requirements and also the underlying service requirements. Based on these requirements, the Orchestrator, NFVO+, will map and connect the VAFs to the appropriate service function(s), realized as VNFs as well. The VAFD may also contain application KPIs requirements that can be used by the NFVO+ to ensure that the application function(s) is/are getting the appropriate level of service from the underling MEC service platform.

Figure 5:
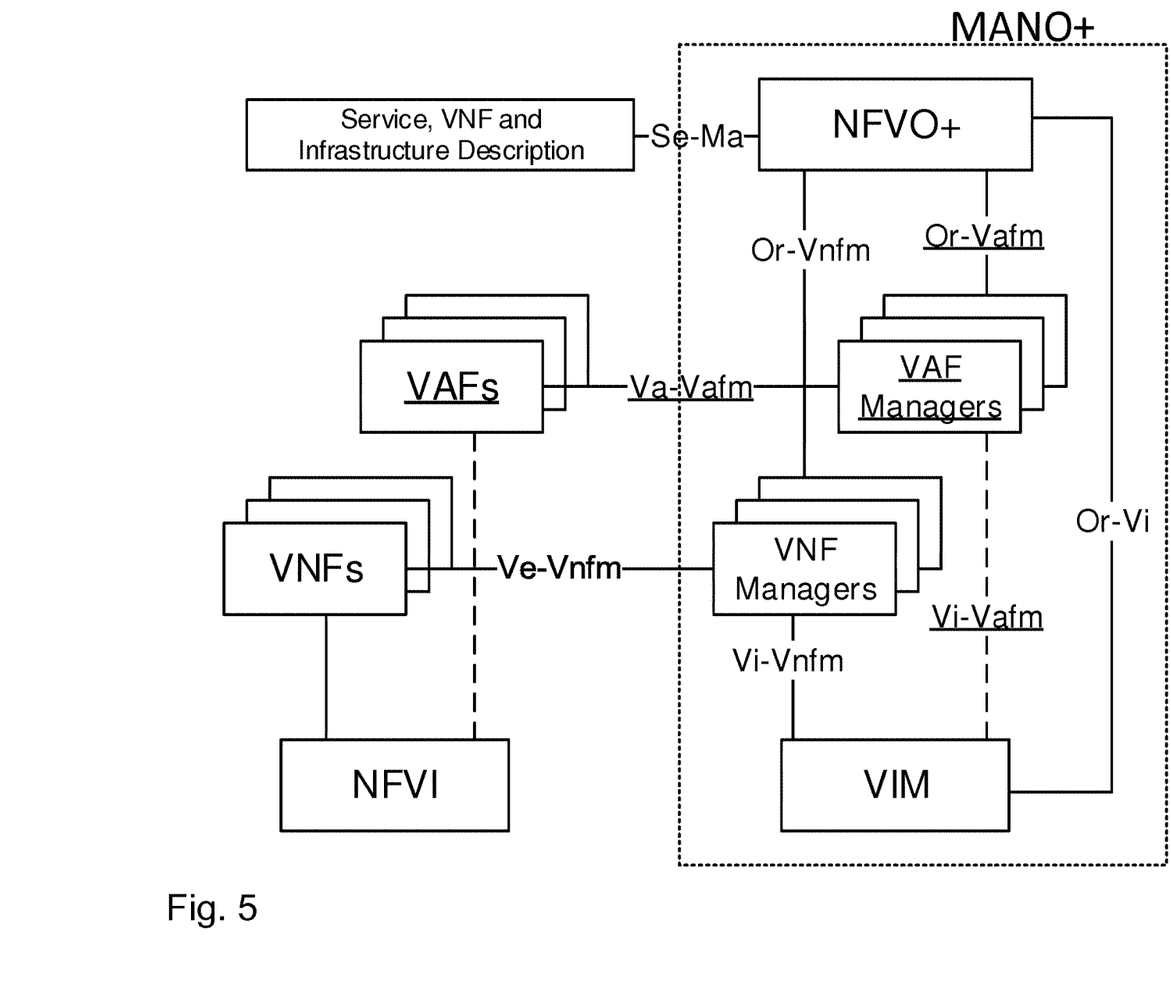
FIG. 5 is showing within a diagram the extended NVF framework architecture including the MANO+ system.

The proposed extensions are depicted in FIG. 5.

The rationale behind these extensions is to reflect into the NFV architecture the conceptual separation between network applications and network functions. Network applications may contribute to provide and/or enhance a network service, e.g., video throughput optimization, and they leverage the existing network functions. The MEC initiative aims at fostering the development and deployment of network applications, being the major but not the only driver for having network applications in the service chain of a network service.

The Orchestrator includes now the logic to build a network service constituted by both network functions and network applications. The NFVO+ retrieves the necessary information from the Service, VNF and Infrastructure description module, that now contains also the VAFs description.

Considering certain end-user services, there is a hard dependency between a particular network application and one or multiple network functions especially for achieving specific performance targets. Such flexible service composition should be performed by the NFVO+ that takes into account both MEC application and VNF aspects based on repositories information. As an example, a MEC application may require one or more MEC services that are instantiated as VNFs. In this view, the VAF Manager for an application is supposed to collect the information to assess that the underneath network functions are providing the expected performance level. When such requirements are not met, the NFVO+ is triggered in order to apply the appropriate actions to manage the MEC service and VNFs accordingly.

Figure 6:
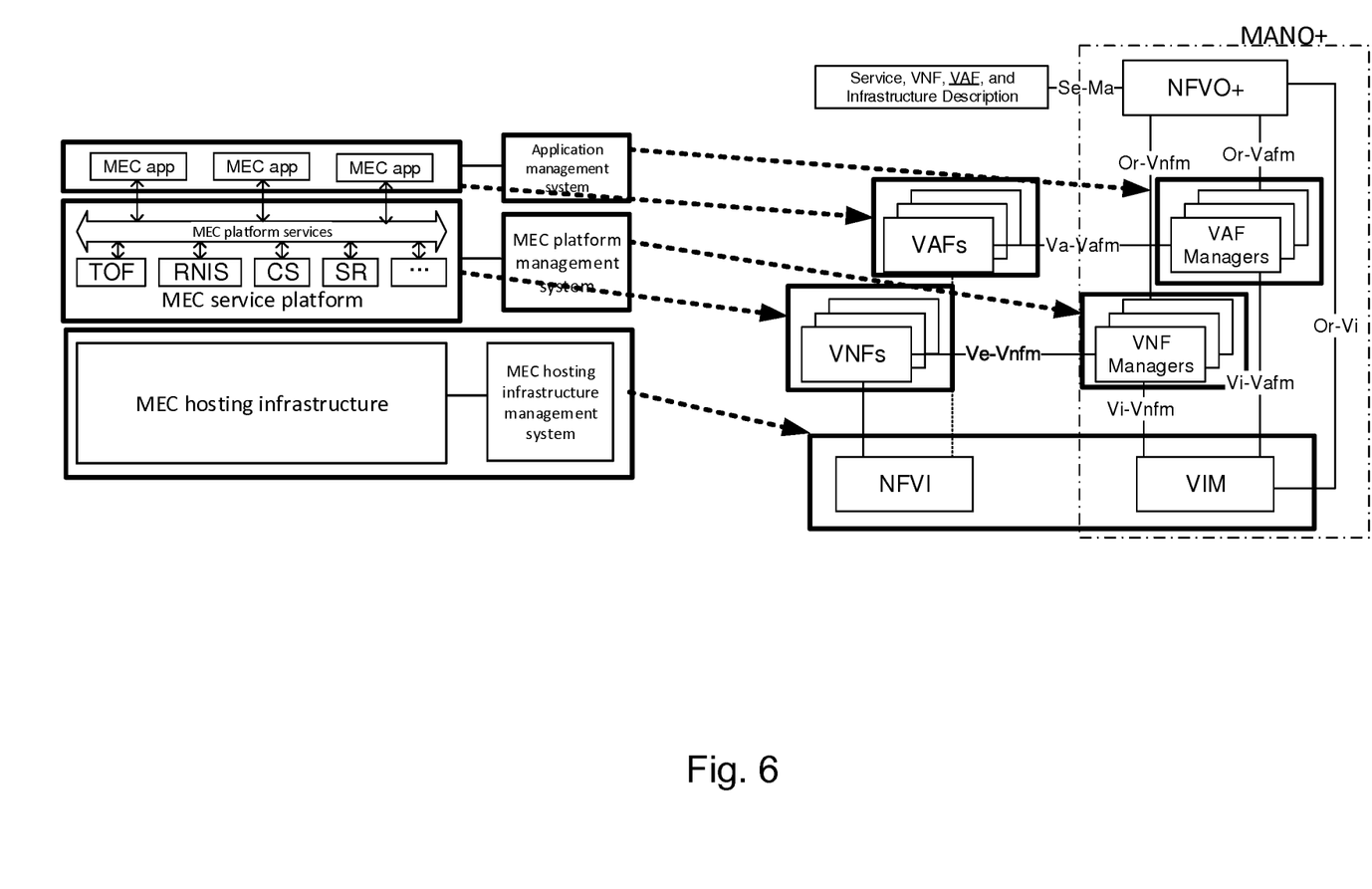
FIG. 6 is showing within a diagram a mapping between MEC and NFV architectures.

Therefore, the mapping of the MEC architecture to the extended NFV framework architecture would result as per FIG. 6.

This architecture enables to deploy a MEC management functionality alongside an NFV MANO system, and both management systems would be orchestrated by the same entity, the NFVO+. Such an enhanced orchestrator could be realized as single element, or split into two components: an orchestrator dedicated to MEC, and another dedicated to the NFV system, that would control the former in a sort of master/slave relation. Such relation would be realized through a dedicated interface.

By doing so, the network extends its set of network services from a collection of network functions to a collection of network functions and network applications, let these be MEC-based, or any other future application. For example, the extended set of network services might include video and selected traffic optimization, machine-type-communication, vehicular communications, etc.

Figure 7:
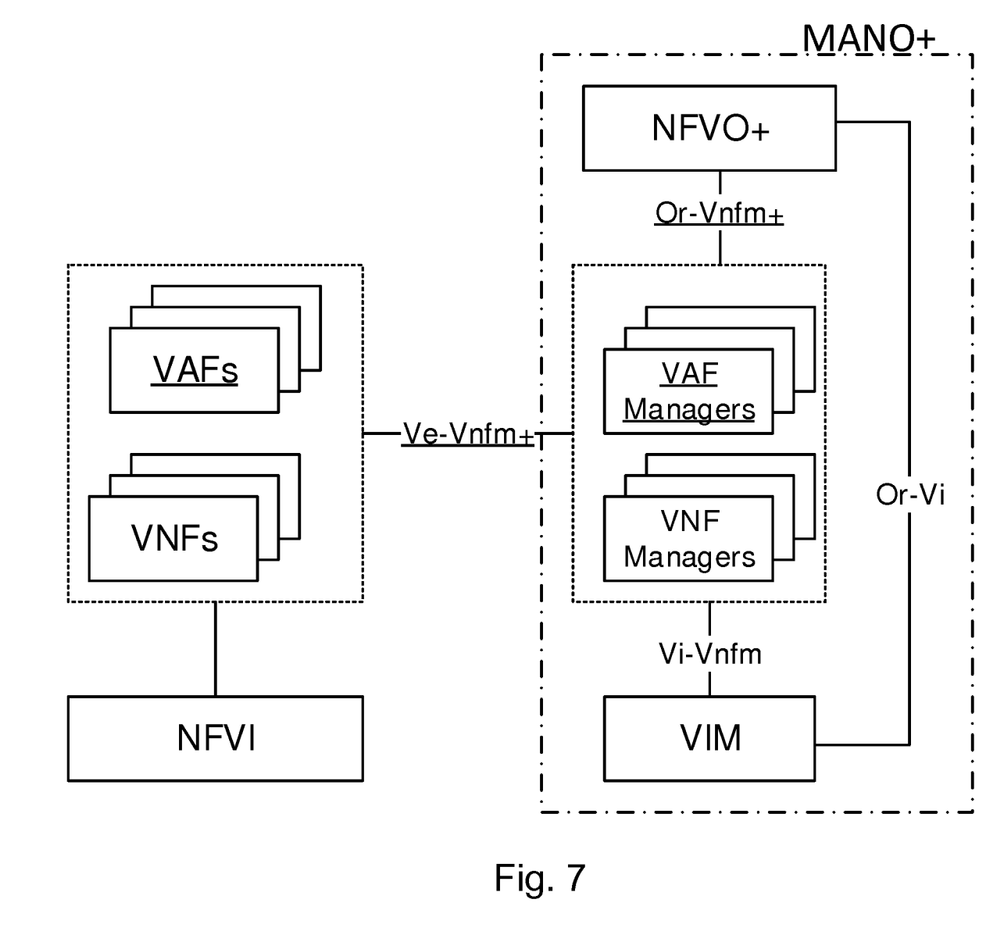
FIG. 7 is showing within a diagram an inclusion of VAF within VNF and VAFM within VNFM.
Figure 8:
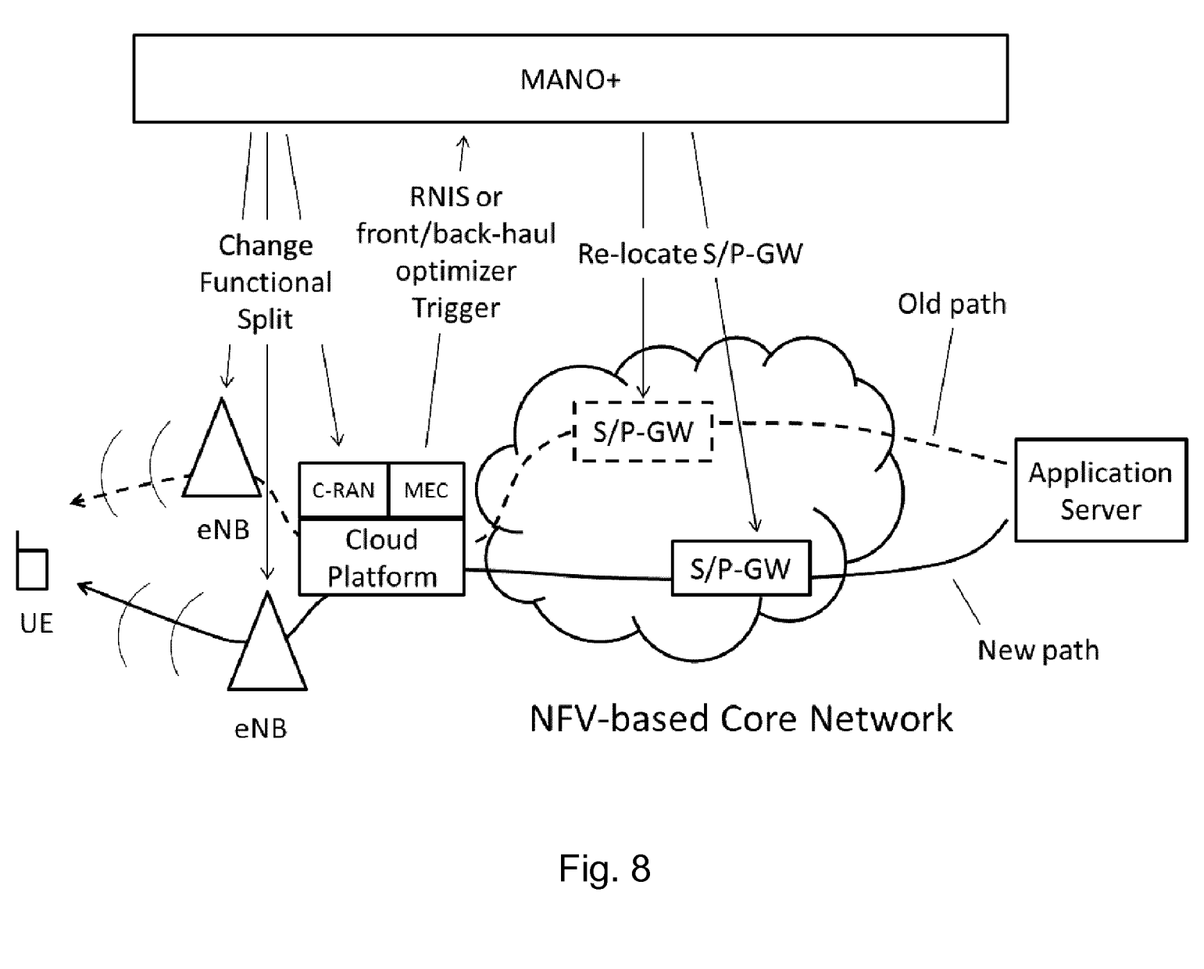
FIG. 8 is showing within a diagram an enhancement of the performance of video application with the NFV/MEC joint orchestrator and FIG. 9 is showing within a diagram a VAFs mobility triggering service provisioning.

It should be noted that this invention can be also applied to the case where VNFs are extended to incorporate VAFs, as well as VAFMs included in VNFMs. In this scenario, depicted in FIG. 7, the VAF and VAFM can be seen as internal modules of the current VNF and VNFM, and they would be designed specifically to include application level management to the MANO operations. This architectural deployment requires extending the current Ve-Vnfm and Or-Vnfm reference points in order to accommodate the interfaces specific to VAFs and VAFM.

In one embodiment of this invention, a MEC function, for instance a Radio Network Information Service, RNIS, can provide feedback regarding the functional split of a flexible centralized RAN architecture. The radio characteristics can trigger the MANO+ to take action in order to improve the performance of attached users considering a different functional split. In particular, the RNIS may trigger the MANO+ to examine alternatives in splitting the base station. This can take place when the performance of an application decreases due to radio conditions or due to front-haul conditions causing the MANO+ to provide a different functional split assuming a flexible cloud-RAN arrangement. This can assure an increased capacity in the front-haul by shifting RAN functions from the centralized Baseband Unit, BBU, towards the edge or Remote Radio Head, RRH, assuring enhanced capacity in the front-haul. Alternatively, by shifting base station functions from the RRH towards the BBU it enables for example Cooperative Multi-Point, ComP, or better scheduling and interference coordination.

Alternatively a MEC front-haul/back-haul optimizer function can trigger the MANO+ to provide changes in virtualized functions of the core network, including for example the re-location of a Serving/PDN-Gateway by shifting a virtual machine into a new location that assures a delay reduction or enhanced resources in the backhaul. It should be noted that the examples provided do not compose an exhaustive list and other alternative MEC applications may be combined with virtualized network functions by other possible arrangements.

Another embodiment of this invention is related to mobility support in the context of MEC applications. Under certain circumstances, like a moving user or resource management, the UE is forced to associate to a different cell, i.e., to perform handover, requiring to maintain active sessions without interruption. In a MEC context, mobility support can be realized by transferring the user-related application content and other contextual information from the application running in the source cell to the application instance running in the target cell.

When a handover takes place, the role of the NFVO+ is to make sure that the VAFs' service requirements are satisfied in the new location. This means that, in order to meet necessary service level performance, the NFVO+ might trigger an action on VNFs in the target cell to fulfill the necessary service level, like, for example, adding an additional RNIS service instance for load balancing and/or relocating an S/P-GW.

Figure 9:
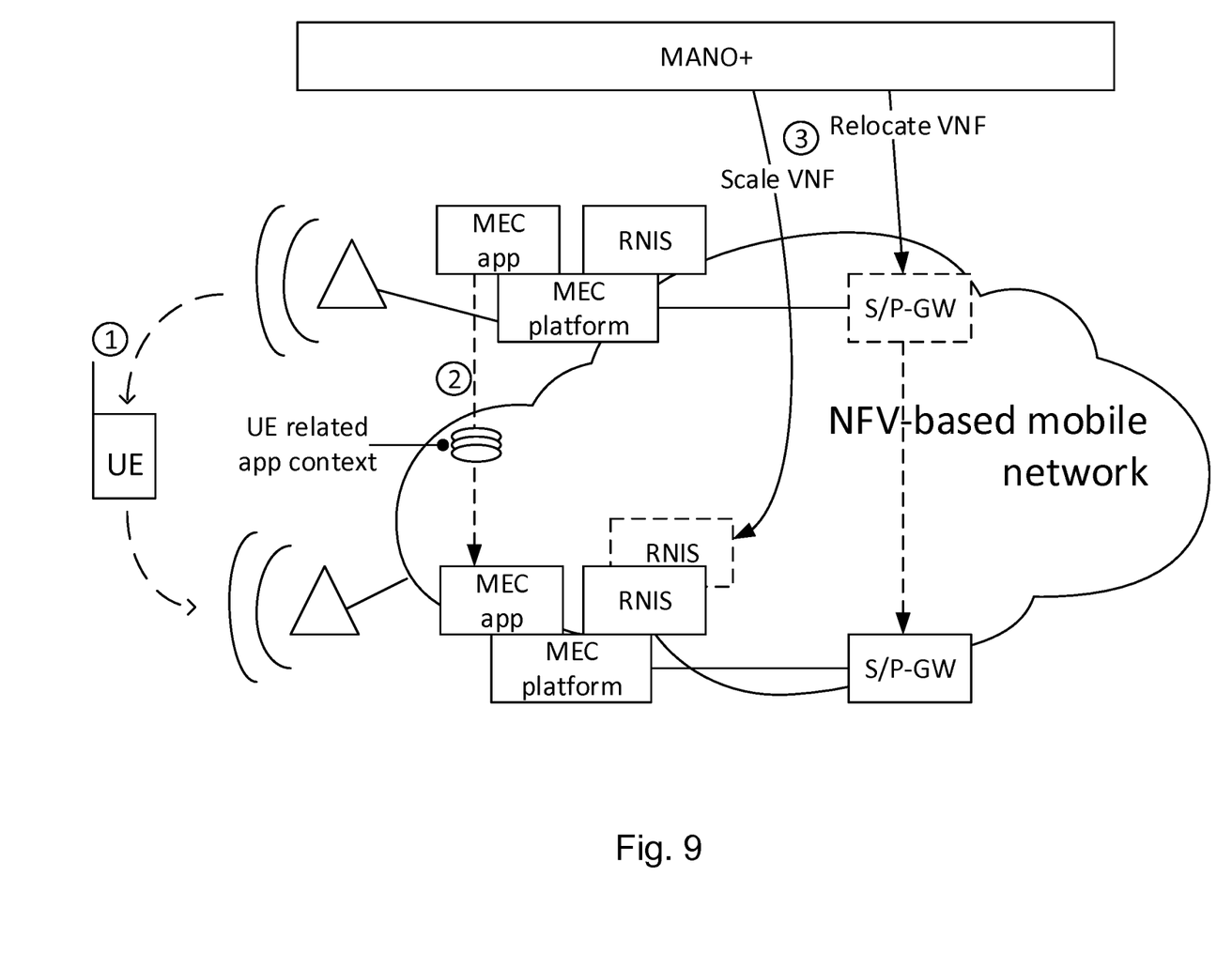

The example is illustrated in FIG. 9 and elaborated next. A UE is connected to a MEC application that leverages the MEC platform's RNIS. Both the MEC application and the MEC service are running on the same MEC platform, respectively as a VAF and a VNF. When a handover occurs, in step 1) the UE might move to a cell associated to another MEC platform and in step 2) the VAF and its VAF manager coordinate a context transfer from the application running in the source cell and the application running in the target cell. The movement of the session into the new location can increase the demand for the RNIS service. Hence, in step 3) the MANO+ initiates an additional VNF scaling out the RNIS service. In addition, the use of a new MEC platform closer to the user can be beneficial due to proximity, but the priori assigned S/P-GW can cause backhaul congestion or increased delay degrading the performance of other user communications. Hence in step 3) the MANO+ can also perform a S/P-GW re-location to optimize the data path for the UE new location.

It is to be understood that for all above mentioned embodiments various types of network applications can be supported or used. There is no limitation to MEC applications. If there is mentioned a MEC Orchestrator, this expression or definition will also cover an Orchestrator for supporting other types of network applications and not only MEC applications. There is no limitation to such MEC applications.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for jointly managing and orchestrating virtual application functions and virtual network functions through a single management and orchestration (MANO) framework within a network, the method comprising:
creating, by a MANO Orchestrator of the MANO framework, at least one virtual network application and a mobile edge computing (MEC) service platform, the MEC service platform including one or more virtual network functions (VNFs);
providing a virtual application function (VAF) as a container for the at least one virtual network application, the VAF being mapped and connected to the one or more VNFs of the MEC platform such that the VAF is configured to utilize services provided by the one or more VNFs of the MEC platform;
providing, in the MANO framework, a VAF manager (VAFM) configured to perform lifecycle management for the VAF and a VNF manager (VNFM) configured to perform lifecycle management for the one or more VNFs of the MEC platform;
providing a first set of interfaces, the first set of interfaces including an interface between the VAFM and the MANO Orchestrator, an interface between the VAF and the VAFM, and an interface between the VAFM and a virtualized infrastructure manager (VIM) of the MANO framework; and
providing a second set of interfaces, the second set of interfaces including an interface between the VNFM and the MANO Orchestrator, an interface between the at least one VNF and the VNFM, and an interface between the VNFM and the VIM of the MANO framework.

2. The method according to claim 1, wherein the MANO framework includes a combination or joint of a management system architecture for virtual application functions with a network function virtualization (NFV) MANO architecture.

3. The method according to claim 1, wherein the VAFM is configured to interact with the VNFM to jointly perform MANO operations for the VAF and the one or more VNFs of the service platform.

4. The method according to claim 2, wherein the management system architecture for virtual application functions is combined or joint with the NFV MANO architecture under a single platform.

5. The method according to claim 2, further comprising providing a service platform of the management system architecture for virtual application functions by a virtual function within the NFV MANO architecture.

6. The method according to claim 5, wherein the service platform is handled as a single VNF, a VNF is provided for each service instance of the service platform, or a VNF is provided for a selected set of service instances of the service platform.

7. The method according to claim 2, wherein a platform management system is mapped to or combined with at least one manager of the NFV MANO architecture.

8. The method according to claim 1, wherein the VAF and the VAFM are provided as internal modules of a VNF and the VNFM, respectively.

9. The method according to claim 1, wherein a virtual network function or virtual application function or MEC function triggers the system for virtual application function and virtual network function management and orchestration to improve or optimize a performance of an attached user or to provide changes or rearrangements in virtualized or virtual functions of a core network.

10. The method according to claim 1, wherein the MANO orchestrator is an orchestrator for both virtual application functions and virtual network functions.

11. The method according to claim 1, wherein the at least one virtual network application includes at least one MEC application.

12. The method according to claim 1, further comprising performing, by the VAFM, MANO operations for the VAF and performing, by the VNFM, MANO operations for the one or more VNFs of the service platform.

13. The method according to claim 12, wherein the MANO operations for the VAF are triggered by performance measurements of the VAF, and wherein the MANO operations for the one or more VNFs of the service platform are triggered by an assessment, by the VAFM, of the performance level provided by the one or more VNFs of the service platform.

14. The method according to claim 12, wherein a runtime process of the VAF triggers the MANO operations for the one or more VNFs of the service platform.

15. The method according to claim 13, wherein the performance measurements of the VAF indicate whether a user device experiences minimum service requirements for the VAF.

16. The method according to claim 12, wherein the MANO operations for the VAF include a context transfer of the VAF from a source cell to a target cell, and wherein the MANO operations for the one or more VNFs of the service platform include a scaling out of a Radio Network Information Service (RNIS) in the target cell.

17. A network for jointly managing and orchestrating virtual application functions, virtual network functions, and network applications, the network comprising:
a MANO Orchestrator configured to create at least one virtual network application and a mobile edge computing (MEC) service platform, the MEC service platform including one or more virtual network functions (VNFs);
a virtual application function (VAF), the VAF being a container for the at least one virtual network application, the VAF being mapped and connected to the one or more VNFs of the MEC platform such that the VAF is configured to utilize services provided by the one or more VNFs of the MEC platform;
a VAF manager (VAFM) configured to perform lifecycle management for the VAF; and
a VNF manager (VFNM) configured to perform lifecycle management for the at least one VNF;
wherein a first set of interfaces is provided that includes an interface between the VAFM and the MANO Orchestrator, an interface between the VAF and the VAFM, and an interface between the VAFM and a virtualized infrastructure manager (VIM) of the MANO framework, and
wherein a second set of interfaces is provided that includes an interface between the VNFM and the MANO Orchestrator, an interface between the at least one virtual network function and the VNFM, and an interface between the VNFM and the VIM of the MANO framework.

18. An orchestrator entity configured to perform the method for jointly managing and orchestrating virtual application functions and virtual network functions according to claim 1.

* * * * *